United States Patent
Seshadri et al.

(10) Patent No.: US 9,942,157 B2
(45) Date of Patent: Apr. 10, 2018

(54) METHOD AND APPARATUS TO AVOID NEGATIVE COMPRESSION IN CONSUMER INTERNET NETWORKS

(71) Applicant: Hughes Network Systems, LLC, Germantown, MD (US)

(72) Inventors: Kartik Seshadri, Germantown, MD (US); Amit Arora, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 103 days.

(21) Appl. No.: 14/829,761

(22) Filed: Aug. 19, 2015

(65) Prior Publication Data
US 2017/0055178 A1 Feb. 23, 2017

(51) Int. Cl.
*H04L 12/801* (2013.01)
*H04L 29/06* (2006.01)

(52) U.S. Cl.
CPC ............ *H04L 47/193* (2013.01); *H04L 69/04* (2013.01)

(58) Field of Classification Search
CPC ....... H02W 28/06; H04L 47/193; H04L 69/04
See application file for complete search history.

(56) References Cited

U.S. PATENT DOCUMENTS

| | | | | |
|---|---|---|---|---|
| 5,987,022 | A * | 11/1999 | Geiger | H04L 12/66 370/349 |
| 2004/0205249 | A1* | 10/2004 | Berry | H04L 67/02 709/247 |
| 2013/0136000 | A1* | 5/2013 | Torres | H04L 47/326 370/235 |
| 2014/0211813 | A1* | 7/2014 | Gochi Garcia | H04L 69/04 370/477 |

\* cited by examiner

*Primary Examiner* — Andrew Lai
*Assistant Examiner* — Harry H Kim
(74) *Attorney, Agent, or Firm* — Nath, Goldberg & Meyer; Leonid D. Thenor

(57) ABSTRACT

An apparatus and method for avoiding negative compression in communication networks. A TCP connection is identified from traffic data being received across the communication network. TCP connections which facilitate HTTP transactions are examined to determine whether compression eligible information is being transmitted. All packets associated with the TCP connection are compressed, if the transaction includes compression eligible information. All packets associated with the TCP connection are output in compressed form. All other packets are output in their originally received form.

17 Claims, 6 Drawing Sheets

METHOD AND APPARATUS TO AVOID NEGATIVE COMPRESSION IN CONSUMER INTERNET NETWORKS

BACKGROUND INFORMATION

A continually increasing trend facing service providers of voice and communication networks is the seemingly endless level of bandwidth required by consumers and content providers. Consumers utilize devices such as mobile phones, tablets, computers, etc. to obtain various types of content. As the number and types of services available over such networks increases, consumer demand for access to such services also increases. Consumer demand for such services can often require greater bandwidth and a higher quality of service than only a short period of time prior.

For example, mobile phones are no longer used simply for web browsing and light data communications. Consumers often use these devices for video conferencing and real-time massively multiplayer gaming that require a constant exchange of significant amounts of data. Consumers also frequently share videos and images that have increased in size due to improvements in the optical qualities of mobile devices. Many content providers allow consumer to stream the contents of television and sporting events directly to devices such as mobile phones and tablets. It is not uncommon for certain consumers to receive all of their television programming, including on-demand movies, over broadband communication networks.

As consumers continue to increase the amount of information carried over the communication network, various concerns become more apparent. For example, a service provider may face difficulties allocating bandwidth for all the content while maintaining a required quality of service. The manner in which data associated with this content is processed can often have a direct effect on things such as congestion and delays. For example, various networking devices perform data compression in order to improve speed and efficiency. Certain types of consumer content, however, are already compressed prior to transmission. This can often cause delays because the networking device utilizes processing time to compress content which is already in a compressed format. Furthermore, it is possible that further compression by the networking device can result in a negative compression ratio wherein the size of the compressed content is actually greater than the original.

It is not always possible to physically increase bandwidth due to the costs associated with deploying the infrastructure. Service providers, therefore, can face many challenges in attempting to maintain consumer satisfaction with limited network capacity. Based on the foregoing, there is a need for an approach which improves one or more aspects in processing data within a broadband communication network.

BRIEF SUMMARY

An apparatus, method, and system are disclosed for avoiding negative compression of information within communication networks. According to an embodiment, the apparatus includes one or more processors configured to: identify a TCP connection from traffic data in a communication network; determine if the TCP connection facilitates an HTTP transaction; detect whether the HTTP transaction includes transmission of compression eligible information; compress all packets associated with the TCP connection, if the HTTP transaction includes transmission of compression eligible information; and facilitate the output of all packets associated with the TCP connection in compressed form, and all other packets in their received form.

According to another embodiment, the method comprises: identifying a TCP connection from traffic data in a communication network; determining if the TCP connection facilitates an HTTP transaction; detecting whether the HTTP transaction includes transmission of compression eligible information; compressing all packets associated with the TCP connection, if the HTTP transaction includes transmission of compression eligible information; and outputting all packets associated with the TCP connection in compressed form, and all other packets in their received form.

According to a further embodiment, the system comprises: a first network hosting at least one user terminal; a second network hosting at least one user terminal; and a gateway configured to route packets between the first network and the second network. The gateway comprises: one or more first ports for transmitting/receiving data to/from the first network; one or more second ports for transmitting/receiving data to/from the second network; and at least one processor configured to: identify a TCP connection from incoming traffic data from the first communication network and/or the second communication network, determine if the TCP connection facilitates an HTTP transaction, detect whether the HTTP transaction includes transmission of compression eligible information, and compress all packets associated with the TCP connection, if the HTTP transaction includes transmission of compression eligible information. The gateway outputs all packets associated with the TCP connection in compressed form, and outputs all other packets in their received form.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and system for reducing and/or avoiding negative compression are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
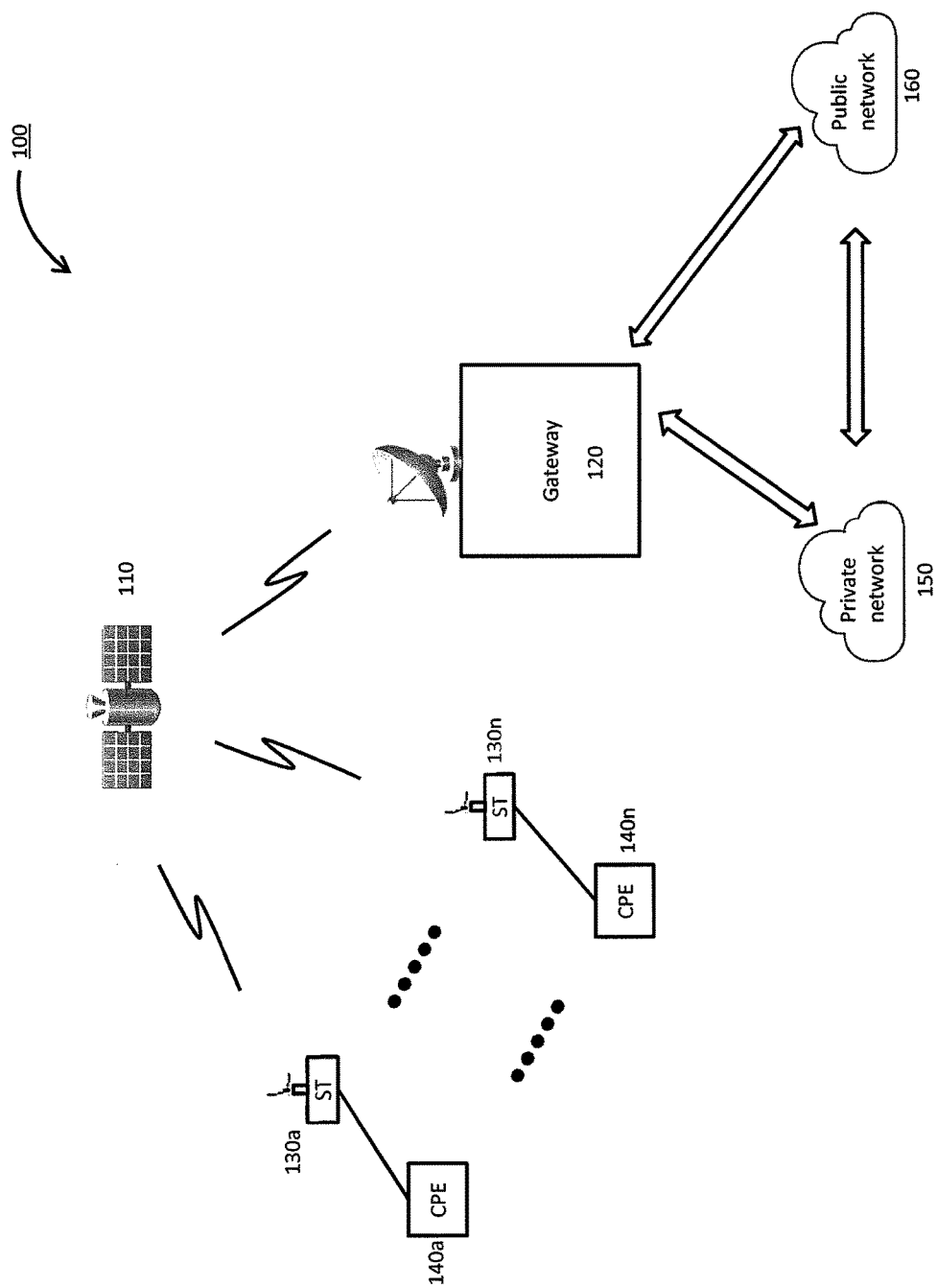
FIG. 1 is a diagram of a conventional satellite communication system capable of providing voice and data services.

FIG. 1 illustrates an exemplary satellite communication system 100 capable of supporting communications among terminals with varied capabilities, according to one or more embodiments. The communication system 100 includes a satellite 110 that supports communications among a number of gateways 120 (only one shown) and multiple satellite terminals (STs) 130a-130n. According to various embodiments, the Satellite link constitutes a Wide-Area Network (WAN). Each satellite terminal (or terminal) 130 can be configured for relaying traffic between its customer premise equipment 140a-140n, a public network such as the Internet 160, and/or from its private network 150. The gateway 120 can be configured to route this traffic across the private network 150 and public Internet 160 as appropriate. The gateway 120 can be further configured to route traffic from the private network 150 and public Internet 160 across the satellite link to the appropriate terminal 130. The terminal 130 then routes the traffic to the appropriate customer premise equipment 140.

As illustrated in FIG. 1, the satellite communication system 100 facilitates communication between a satellite network, private communication networks 150, and public communication networks 160. Various embodiments, however, can also be configured for providing communication within only a terrestrial network (e.g., private communication networks 150 and public communication networks 160), or within only a satellite network. Thus, while components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
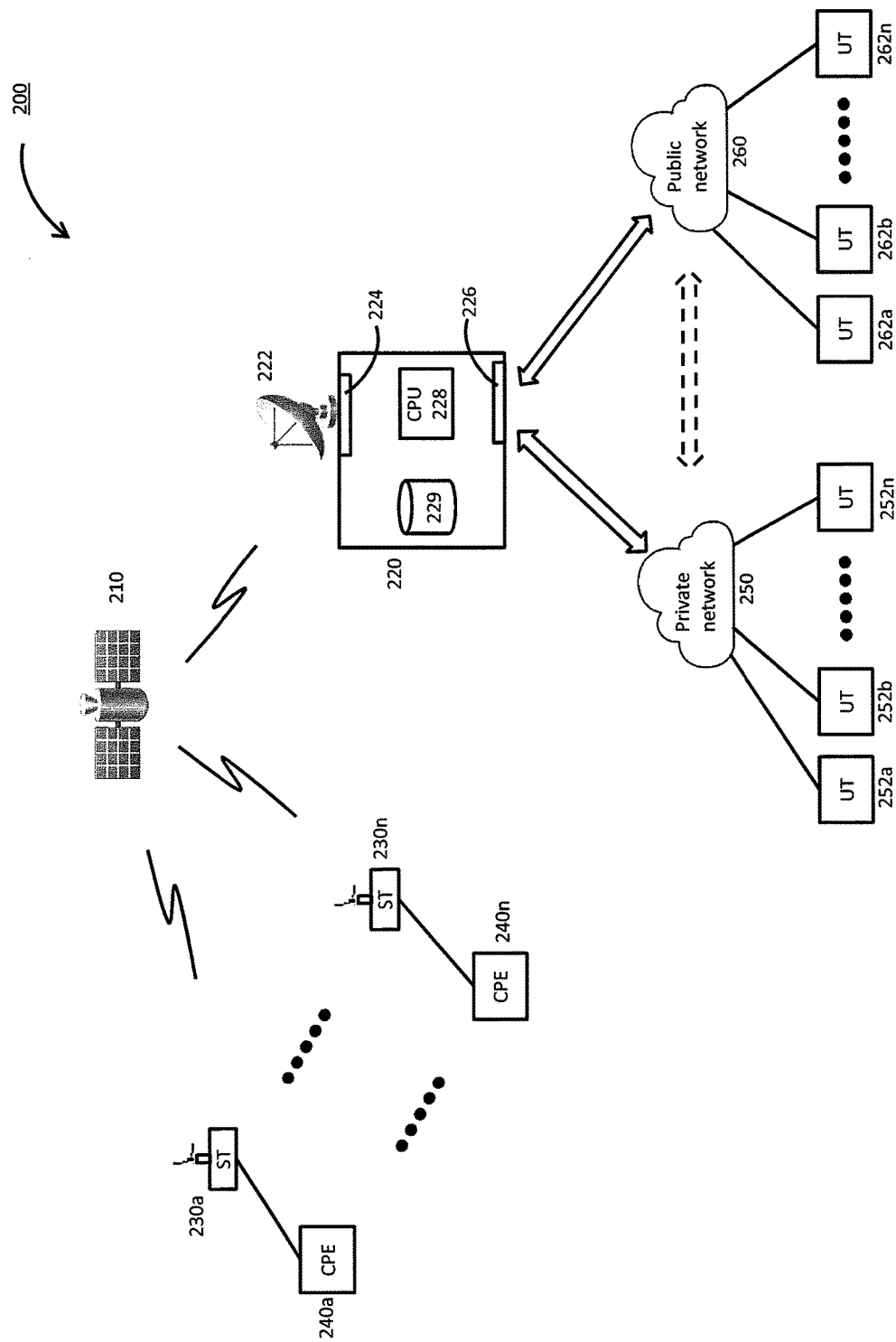
FIG. 2 is a diagram of a system capable of avoiding negative compression, according to one embodiment.

FIG. 2 illustrates a system 200 capable of reducing and/or avoiding negative compression in accordance with at least one embodiment. The system 200 illustrates communication between various types of networks including, for example, a satellite network, a private network, and a public network. According to the illustrated embodiment, a gateway 220 is provided to facilitate communication between a satellite 210 and the various external networks. The external networks can include, for example, a private network 250 (e.g., service provider or employer network) and a public network 260 (e.g., the Internet). While FIG. 2 shows a single gateway 220, it should be appreciated that additional gateways may be provided at different points within the system 200. For example, the private network 250 can include one or more gateways, and the public network 260 can also include one or more gateways.

In order to exchange information with the satellite 210, the gateway 220 can include a transmitter 222 which transmits/receives information to/from the satellite 210. The gateway 220 can further include one or more first ports 224 which can be assigned specific designations (or port numbers) for routing and/or prioritizing data along various backbones (or channels) of the satellite 210. A plurality of satellite terminals 230a-230n are provided for communicating with the gateway 220 along a bent pipe path facilitated by the satellite 210. The satellite terminals 230 can be, for example, in the form of very small aperture terminals (VSAT) capable of transmitting/receiving information to/from the satellite 210.

According to the illustrated embodiment, each satellite terminal 230 can be connected to one or more customer premise equipment (CPE) 240a-240n. The customer premise equipment 240 can be in the form of various user devices capable of network communication using wired or wireless techniques. Such devices can include, for example, personal computers, laptops, tablets, mobile phones, home routers, etc. Wired communication can be achieved using physical Ethernet cables, USB cables, etc. Additionally, wireless communication can be achieved via standard wireless methods such as 802.11a/b/g/n/AC, Bluetooth, etc. The customer premise equipment can establish connections with the private network 250 and/or public network 260 in order to exchange information with various devices.

As illustrated in FIG. 2, the private network 250 also facilitates connection by various user terminals 252a-252n. Similarly, the public network 260 facilitates communication by various user terminals 262a-262n. The user terminals (252, 262) connected to the private and public networks (250, 260) can be in the form of personal computers, laptops, tablets, mobile phones, etc. The gateway 220 also includes one or more second ports 226 through which traffic can be exchanged with the private network 250 and the public network 260. Thus, a customer premise equipment 240 can establish a connection with a user terminal 252 within the private network 250 and/or a user terminal 262 within the public network 260 via the satellite 210 and the gateway 220. Optionally, user terminals 252 can establish connections with user terminals 262 via gateways (not shown) included within the private network 250 and the public network 260. Such gateways can be configured in the same manner as gateway 220, as discussed below.

According one or more embodiments, the gateway 220 is configured to reduce and/or avoid negative compression of information that is transmitted between the satellite 210, the private network 250, and/or the public network 260. The gateway 220 can include, at least in part, one or more processors 228 (also referred to as CPU, processing unit, etc.) that are configured to perform various processing tasks, including determining whether information being transmitted through the gateway 220 should be compressed. The gateway 220 also includes a storage unit 229 for maintaining various information.

While FIG. 2 illustrates a single processor 228, it should be noted that various embodiments can allow for incorporation of multiple processors. Furthermore, additional embodiments can incorporate one or more routers and/or routing modules (not shown) within the gateway 220 to perform routing functions associated with the first ports 224 and the second ports 226. Thus, certain embodiments provide for the gateway 220 to perform layer-3 functions such as routing and congestion control, whereas other embodiments provide for specific routing modules (or routers) for handling such functions.

According to the illustrated embodiment, the gateway 220 functions as part of a layer-3 network which transmits and receives information in the form of packets. When communication is established between the satellite 210, private network 250, and/or the public network 260, the processor 228 is configured to monitor packets being received from the satellite 210, private network 250, and/or the public network 260. According to at least one embodiment, this can be accomplished by utilizing a sniffer module and/or configuring the processor to perform a sniffer function which only examines certain information, such as packet headers, without performing any additional processing of the received packets. According to various embodiments, the processor 228 can be configured to monitor traffic data (or packets) that is incoming to the gateway 220, either alone or in combination with the sniffer module. The processor 228 then determines whether or not the incoming packets represent a TCP connection.

According to at least one embodiment, the processor 228 can detect whether a TCP handshake has been initiated and concluded. Upon detecting conclusion of the TCP handshake, the processor 228 examines the header of the first TCP segment within an IP flow. As used herein, an IP flow can be defined as a unidirectional set of packets, wherein all packets in the flow have the same transport level end points. In the case of TCP, an IP flow can be identified by the protocol type (i.e., TCP), the source IP address, source port, destination IP address, and destination port. The processor 228 examines the "destination port" field of the header in order to identify the number of the destination port. The processor 228 next determines whether the port number identifies a destination port that is generally associated with, or used for, HTTP transactions. As can be appreciated, there are certain network ports that are reserved for conducting HTTP transactions including, for example, port numbers 80, 81, 8008, 8080, 8081, etc. Thus, if the destination port specified in the header of the first HTTP segment corresponds to one of the designated ports, the processor 228 identifies the transaction as an HTTP transaction.

The processor 228 next determines whether or not the HTTP transaction includes transmission of information that would be eligible for compression. As can be appreciated, a large number of transactions over communication networks are HTTP transactions. These transactions, however, can incorporate transmission of information that is both compression eligible and not compression eligible. For example, many users download content that is in the form of music, photos, and video. Such information is oftentimes maintained in a compressed format for purposes of reducing storage space. The content, however, is also transmitted in the compressed format. For example, music content is often transmitted in the form of MP3 or wav files, whereas video is often stored and transmitted in the form of MPEG2 or MPEG4 files. Such information, therefore, does not require further compression.

Depending on the specific file and compression format, it is possible to achieve a negative compression ratio if further attempts are made to compress the information. As used herein, a negative compression ratio refers to a condition where information having a first size is compressed into information having a second size, and the second size is greater than the first size. As can be appreciated, negative compression can actually result in increased information being transmitted over the communication network. Furthermore, significant processing time is utilized for compressing the information, thus reducing the processor's ability to perform other tasks.

According to one or more embodiments, the processor 228 can determine whether the information is eligible for compression by examining the header in the first HTTP packet. In particular, the processor 228 determines if a "content-type" field within the header contains a type which matches an entry from a list of predetermined content types. The list of predetermined content types can be maintained, for example, within the storage unit 229 of the gateway 220. If the content type included in the HTTP header matches an entry from the list of predetermined content types, then the processor 228 concludes that the information included in the HTTP transaction is eligible for compression.

According to various embodiments, the predetermined content types can correspond to any content type whose compressed size would be smaller than its original size. According to further embodiments, the predetermined content types can include text, HTML, JavaScript, XML, JSON, etc. As can be appreciated, the foregoing list is only illustrative, and various other content types can be included. According to at least one embodiment, once the content type is determined to be eligible for compression, all packets associated with the TCP connection (or IP flow) are automatically compressed without examination of the "content-type" field. According to further embodiments the list of predetermined content types can specify various content types that are already in compressed, or executable, form. Thus, if the "content-type" field matches an entry in the list of predetermined content types, no compression is applied to the TCP connection (or IP flow).

Depending on the specific information being transmitted during the HTTP transaction, the content-type field may be omitted. The "content-type" field may also specify a content type which cannot be identified as compression eligible, or otherwise absent from the list of predetermined content types. According to at least one embodiment, the processor 228 can further examine the "content-encoding" field within the header of the first HTTP packet. The processor 228 determines whether the content encoding matches and entry from a list of predetermined content encodings. Similar to the list of predetermined content types, the list of predetermined content encodings can be stored in the storage unit 229. Thus, the processor 228 would perform a lookup in order to determine whether the entry in the "content-encoding" field matches one of the content encodings contained in the list of predetermined content encodings.

According to at least one embodiment, the list of predetermined content encodings can include any type of content encoding that specifies, or is associated with, a compressed format. Thus, if the entry in the content-encoding field specifies a compressed format, then no compression would be applied to packets associated with the TCP connection (or IP flow). According to additional embodiments, the predetermined content encodings can include any MPEG type, MP3, zip, gzip, deflate, tar, tiff, jpeg, etc. As can be appreciated, the foregoing list is only illustrative, and various other content encodings can be included. According to still further embodiments, the list of predetermined content encodings can specify various uncompressed formats. According to such embodiments, a matching entry would result in compression of all packets associated with the IP flow.

As illustrated in FIG. 2, various features have been shown an described with respect to a gateway 220. It should be noted, however, that features described herein can be implemented in various other network components. For example, various types of routers and routing devices (e.g., edge routers) can be designed to incorporate the features described with respect to the gateway. Furthermore, any networking components that perform compression of packets prior to transmission can be configured to incorporate the previously described features in order to reduce bandwidth and improve efficiency. Furthermore, gateways provided within the private network 250 and the public network 260 can be configured in the same manner as gateway 220, thereby providing additional bandwidth reductions. Thus, the use of a gateway 220 should only be considered as illustrative and not restrictive.

Figure 3:
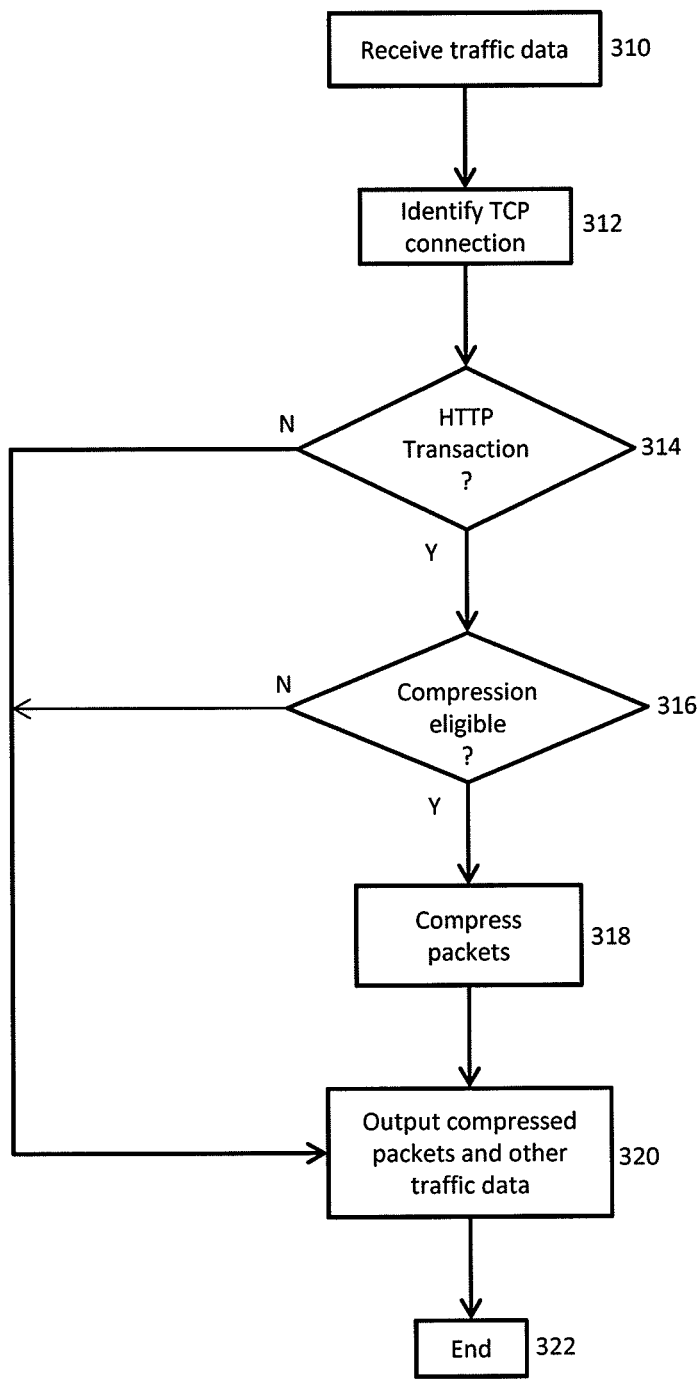
FIG. 3 is a flowchart of a process for avoiding negative compression, according to at least one embodiment.

FIG. 3 is a flowchart illustrating the steps performed in a process to reduce and/or avoid negative compression, in accordance with at least one embodiment. At 310, traffic data is received, for example, at the gateway. According to various embodiments, the traffic data can be in the form of a stream of packets. As previously discussed, the traffic data can be received at various other networking devices, including edge routers or any component which normally compresses received information. At 312, a TCP connection is identified within the traffic data.

At 314, it is determined whether the TCP connection facilitates an HTTP transaction. If it is determined that the TCP connection does not facilitate and HTTP transaction, then control passes to 320. If the TCP connection facilitates an HTTP transaction, however, control passes to 316. Is determined whether the information included within the HTTP transaction is eligible for compression. If the information is not eligible for compression, then control passes to 320. If the information included in the HTTP transaction is eligible for compression, then control passes to 318, where all packets associated with the TCP connection are compressed. At 320, all compressed packets, as well as other traffic data are output. Thus, any information which was not determined to be an HTTP transaction, or otherwise eligible for compression would be output in its original format. Accordingly, processor time is not used for compressing such information, which can possibly result in a negative compression ratio. Rather, the processor only compresses information which results in a reduction in size, thereby reducing bandwidth requirements and improving efficiency. The process subsequently ends at 322.

Figure 4:
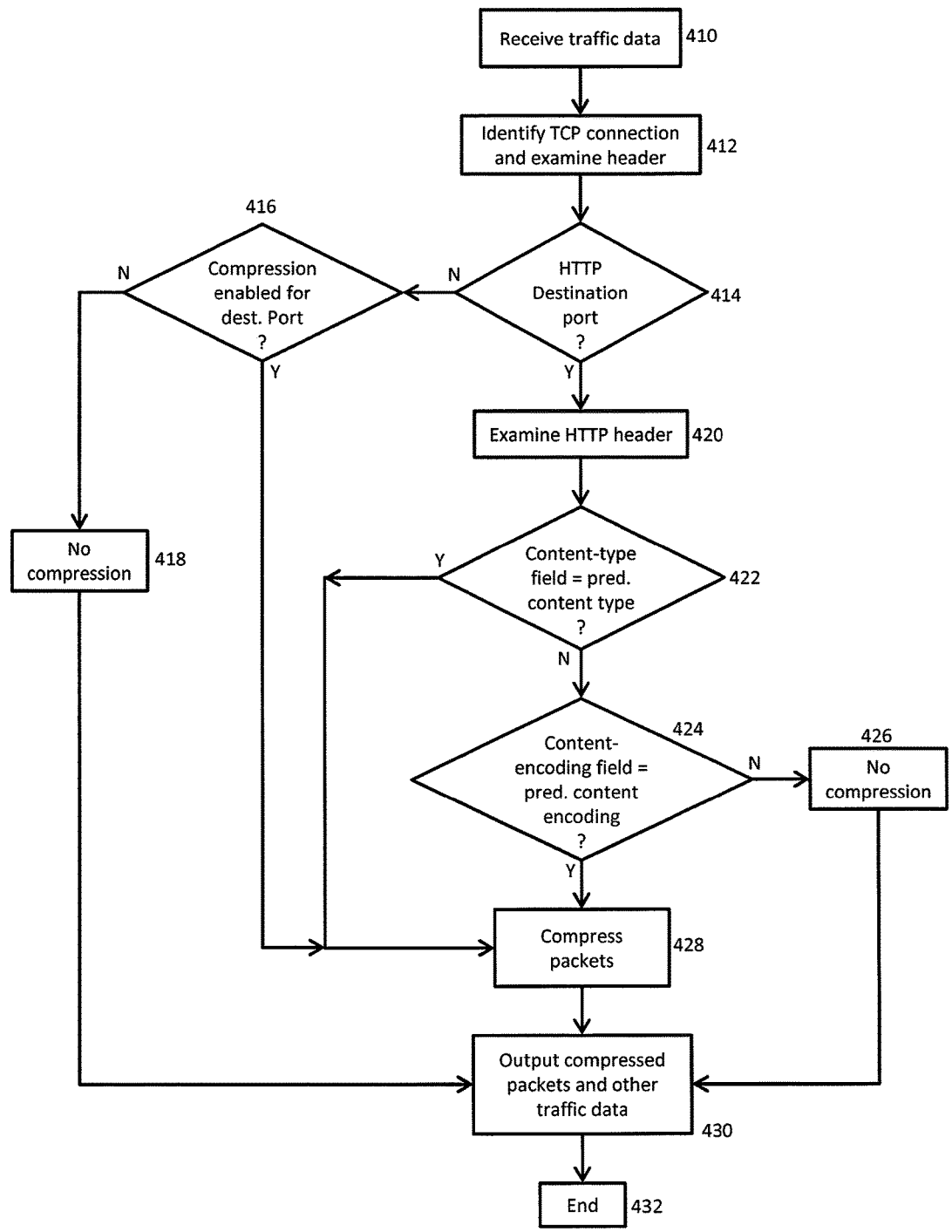
FIG. 4 is a flowchart of a process for avoiding negative compression, according to one or more embodiment.

FIG. 4 is a flowchart illustrating a process for determining whether traffic data should be compressed, in accordance with one or more embodiments. At 410, traffic data is received, for example, at the gateway. According to one or more embodiments, the traffic data can be received in the form of a stream of packets over a layer-3 network. At 412, a TCP connection is identified from the traffic data, and the header of the first TCP segment is examined. At 414, it is determined whether the destination port specified in the TCP header corresponds to a port number normally associated with HTTP transactions. If the destination port does not correspond to a port that is normally associated with HTTP transactions, then control passes to 416. At 416, it is determined whether or not the specified destination port is enabled for compression. If the destination port is not enabled for compression, then control passes to 418 and no compression is applied. Control then passes to 428. Alternatively, if the destination port is enabled for compression, then control passes to 426.

If it is determined, at 414, that the destination port in the TCP header is normally associated with (or reserved for) HTTP transactions, then control passes to 420. The HTTP header is examined in order to determine the values stored in various fields therein. At 422, it is determined if the "content-type" field contains an entry that corresponds to a predetermined content type. If the entry of the "content-type" field specifies a predetermined content type, then control passes to 426. If the entry of the "content-type" field, however, does not specify a predetermined content type, then control passes to 424. The "content-encoding" field within the HTTP header is examined in order to determine whether it contains an entry which corresponds to a predetermined content encoding. If the entry in the content-encoding field corresponds to one of the predetermined content encodings, then control passes to 428. No compression is applied to the packets associated with the TCP connection. Control then passes to 430. If the entry in the content-encoding field does not correspond to one of the predetermined encoding types, then control passes to 428. At 428, all packets associated with the TCP connection are compressed. At 430, all the compressed packets, and other traffic data, are output by the gateway. The process ends at 432.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
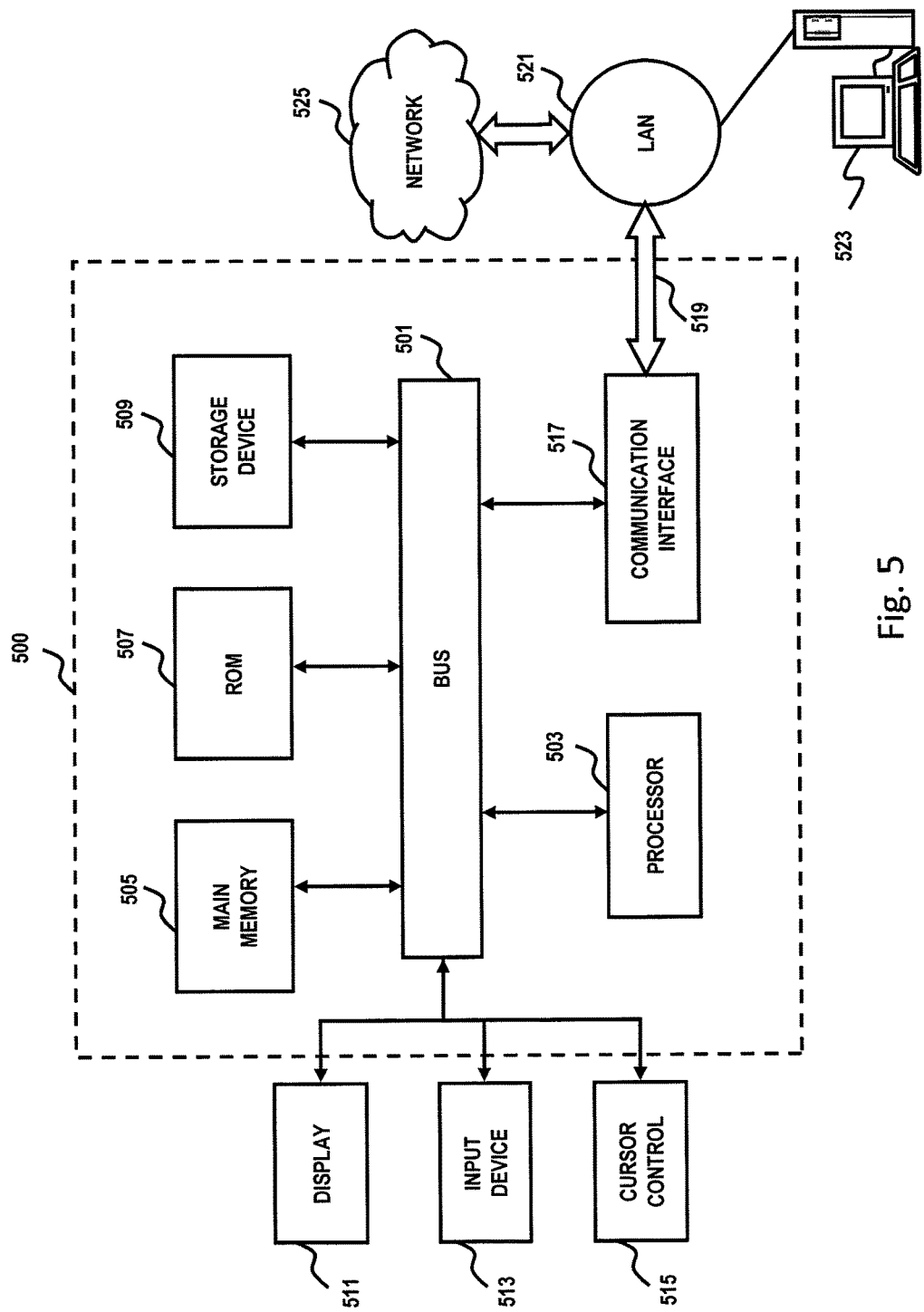
FIG. 5 is a diagram of a computer system that can be used to implement various exemplary embodiments.

FIG. 5 is a diagram of a computer system that can be used to implement various embodiments. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a light emitting diode (LED) or other flat panel displays, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511. Additionally, the display 511 can be touch enabled (i.e., capacitive or resistive) in order facilitate user input via touch or gestures.

According to an exemplary embodiment, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement exemplary embodiments. Thus, exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a High Definition Multimedia Interface (HDMI), etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 such as a wide area network (WAN) or the Internet. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 1000 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Non-volatile media can further include flash drives, USB drives, microSD cards, etc. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 6:
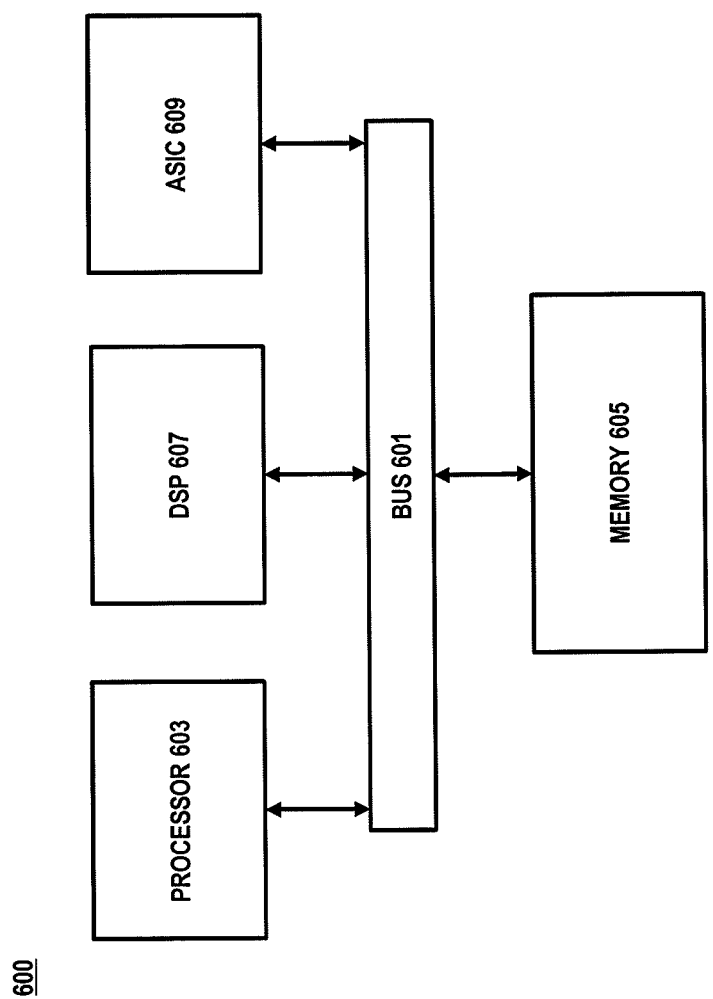
FIG. 6 is a diagram of a chip set that can be used to implement various exemplary embodiments.

FIG. 6 illustrates a chip set 600 upon which an embodiment of the invention may be implemented. Chip set 600 is programmed to implement various features as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of the figures.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 605 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising: identifying a TCP connection from layer-3 traffic data at a satellite gateway in a satellite communication network, based on a layer-3 header, wherein the satellite gateway comprises a transceiver, one or more first ports for exchanging data with the satellite, and one or more second ports for exchanging data with external networks; determining if the TCP connection facilitates an HTTP transaction; detecting whether the HTTP transaction includes transmission of compression eligible information; determining a port number specified in a destination port field of a header TCP segment when the TCP connection does not facilitates an HTTP transaction; compressing, at the satellite gateway, all packets associated with the TCP connection, if the HTTP transaction includes transmission of compression eligible information or if compression is enabled for the port number; and outputting, to a satellite within the satellite communication network, all packets associated with the TCP connection in compressed form, and all other packets in their received form.

2. The method of claim 1, wherein identifying a TCP connection further includes detecting conclusion of a TCP handshake.

3. The method of claim 2, wherein the determining further comprises:
examining a header of a first TCP segment; and
determining if a port number in a destination port field of the header corresponds to a port used for HTTP transactions.

4. The method of claim 1, wherein the detecting further comprises:
examining a header in a first HTTP packet; and
determining if a content-type field in the header includes a type which matches an entry from a list of predetermined content types.

5. The method of claim 4, wherein the predetermined content types include any content type whose compressed size would be smaller than its original size.

6. The method of claim 4, wherein the predetermined content types include text, HTML, javascript, xml, and json.

7. The method of claim 1, wherein detecting further comprises:
examining a header in a first HTTP packet; and
determining if a content-encoding field in the header includes an encoding which matches an entry from a list of predetermined content encodings.

8. The method of claim 7, wherein the predetermined content encodings include content encodings that specify a compressed format.

9. The method of claim 7, wherein the predetermined content encodings include zip, gzip, deflate, tar, exe, mpeg2, mpeg4, mp3, tiff, and jpeg.

10. An apparatus comprising: one or more processors configured to: identify a TCP connection from layer-3 traffic data at a satellite gateway in a satellite communication network, based on a layer-3 header wherein the satellite gateway comprises a transceiver, one or more first ports for exchanging data with the satellite, and one or more second ports for exchanging data with external networks; determine if the TCP connection facilitates an HTTP transaction; detect whether the HTTP transaction includes transmission of compression eligible information; determine a port number specified in a destination port field of a header of a first TCP segment when the TCP connection does not facilitates an HTTP transaction; compress, at the satellite gateway, all packets associated with the TCP connection, if the HTTP transaction includes transmission of compression eligible information or if compression is enabled for the port number; and facilitate the output, to a satellite within the satellite communication network, of all packets associated with the TCP connection in compressed form, and all other packets in their received form.

11. The apparatus of claim 10, wherein the one or more processors are further configured to identify a TCP connection by detecting conclusion of a TCP handshake.

12. The apparatus of claim 10, wherein the one or more processors are further configured to:
examine a header of a first TCP segment; and
determine if a port number in a destination port field of the header corresponds to a port used for HTTP transactions.

13. The apparatus of claim 10, wherein the one or more processors are further configured to:
examine a header in a first HTTP packet; and
determine if a content-type field in the header includes a content type which matches an entry from a list of predetermined content types.

14. The apparatus of claim 13, wherein the predetermined content types include any content type whose compressed size would be smaller than its original size.

15. The apparatus of claim 10, wherein the one or more processors are further configured to:
examine a header in a first HTTP packet; and
determine if a content-encoding field in the header includes an encoding which matches an entry from a list of predetermined content encodings.

16. The apparatus of claim 15, wherein the predetermined content encodings include content encodings that specify a compressed format.

17. A system comprising: a satellite communication network hosting at least one satellite terminal; a second communication network hosting at least one user terminal; and a satellite gateway configured to route layer-3 packets between the satellite communication network and the second communication network, said satellite gateway comprising: one or more first ports for transmitting/receiving data to/from the satellite communication network; one or more second ports for transmitting/receiving data to/from the second communication network; and at least one processor configured to: identify a TCP connection from incoming traffic data from the satellite communication network and/or the second communication network, determine if the TCP connection facilitates an HTTP transaction, detect whether the HTTP transaction includes transmission of compression eligible information, determine a port number specified in a destination port field of a header of a first TCP segment when the TCP connection does not facilitates an HTTP transaction; and compress all packets associated with the TCP connection, if the HTTP transaction includes transmission of compression eligible information or if compression is enabled for the port number, wherein the satellite gateway outputs all packets associated with the TCP connection to a satellite within the satellite communication network in compressed form, and wherein the satellite gateway outputs all other packets to the satellite in their received form.

* * * * *